United States Patent
Huang

(10) Patent No.: US 9,397,914 B2
(45) Date of Patent: Jul. 19, 2016

(54) NETWORK EQUIPMENT AND METHOD FOR SELECTING COMMUNICATION PATH

(71) Applicant: HON HAI PRECISION INDUSTRY CO., LTD., New Taipei (TW)

(72) Inventor: Jia-Xuan Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 137 days.

(21) Appl. No.: 14/187,337

(22) Filed: Feb. 24, 2014

(65) Prior Publication Data

US 2015/0063096 A1 Mar. 5, 2015

(30) Foreign Application Priority Data

Aug. 29, 2013 (TW) .............................. 102130983 U

(51) Int. Cl.
*H04L 12/26* (2006.01)
*H04L 12/24* (2006.01)
*H04L 12/707* (2013.01)
*H04L 12/803* (2013.01)
*H04L 12/841* (2013.01)

(52) U.S. Cl.
CPC ........ *H04L 43/0852* (2013.01); *H04L 41/0663* (2013.01); *H04L 45/22* (2013.01); *H04L 47/125* (2013.01); *H04L 47/283* (2013.01)

(58) Field of Classification Search
CPC ................ H04L 45/24–45/28; H04L 43/0852; H04L 49/557
See application file for complete search history.

(56) References Cited

U.S. PATENT DOCUMENTS

| | | | | |
|---|---|---|---|---|
| 7,180,871 B1* | 2/2007 | Khafizov | ............ | H04L 43/0852 370/252 |
| 8,572,285 B2* | 10/2013 | Huang | .................. | H04L 49/557 370/230 |
| 2005/0018611 A1* | 1/2005 | Chan | ..................... | H04L 41/147 370/241 |
| 2008/0101277 A1* | 5/2008 | Taylor | ................... | G01S 5/0289 370/328 |
| 2010/0312882 A1* | 12/2010 | Taniguchi | ............... | H04L 12/26 709/224 |
| 2012/0246339 A1* | 9/2012 | Huang | .................. | H04L 49/557 709/239 |

FOREIGN PATENT DOCUMENTS

| | | |
|---|---|---|
| CN | 101667933 A | 3/2010 |
| CN | 101667933 A | 3/2010 |
| CN | 101808044 A | 8/2010 |
| TW | 201240410 A1 | 10/2012 |

* cited by examiner

*Primary Examiner* — Xavier Szewai Wong
(74) *Attorney, Agent, or Firm* — ScienBiziP, P.C.

(57) ABSTRACT

A network equipment communicates with customer premises equipment (CPE) through a primary path and a secondary path. The network equipment provides heartbeat packets for the CPE to obtain response times corresponding to the primary and secondary paths; then calculates time differences and capacity of the primary path or the secondary path; and at last switches a path to another path according to the time differences and the capacity of the primary path or the secondary path.

19 Claims, 6 Drawing Sheets

NETWORK EQUIPMENT AND METHOD FOR SELECTING COMMUNICATION PATH

BACKGROUND

1. Technical Field

The disclosure generally relates to computer networking, and particularly to a network equipment and a method for selecting communication paths based on the stream control transmission protocol.

2. Description of Related Art

Network equipments such as computer servers, routers and gateways communicate with corresponding customer premises equipments (CPEs) such as routers, switches, and networking adaptors through different communication paths based on the stream control transmission protocol (SCTP). When the computer server transmits messages to the router through different communication paths, the SCTP can place messages and control information into \data chunks and control chunks to ensure reliable and in-sequence transport of the message with congestion control.

However, when any of the communication paths have abnormal termination or path failure due to interrupted links such as congestion packet loss, error code packet loss, or time delay. Thus, the computer server will fail to switch over automatically to a standby or redundant communication path upon the failure or abnormal termination of the router in real-time, which may increase the packet loss ration of the information or data and reduce transmission rate and quality of the information or data.

Therefore, there is room for improvement within the art.

BRIEF DESCRIPTION OF THE DRAWINGS

Many aspects of a network equipment and method for selecting communication path can be better understood with reference to the following drawings. The components in the drawings are not necessarily drawn to scale, the emphasis instead being placed upon clearly illustrating the principles of the network equipment and the method for selecting communication path. Moreover, in the drawings, like reference numerals designate corresponding parts throughout the several views. Wherever possible, the same reference numbers are used throughout the drawings to refer to the same or like elements of an embodiment.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

The word "module" as used hereinafter, refers to logic embodied in hardware or firmware, or to a collection of software instructions, written in a programming language, such as, for example, JAVA, C, or assembly. One or more software instructions in the modules may be embedded in firmware such as in an EPROM. It will be appreciated that modules can comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
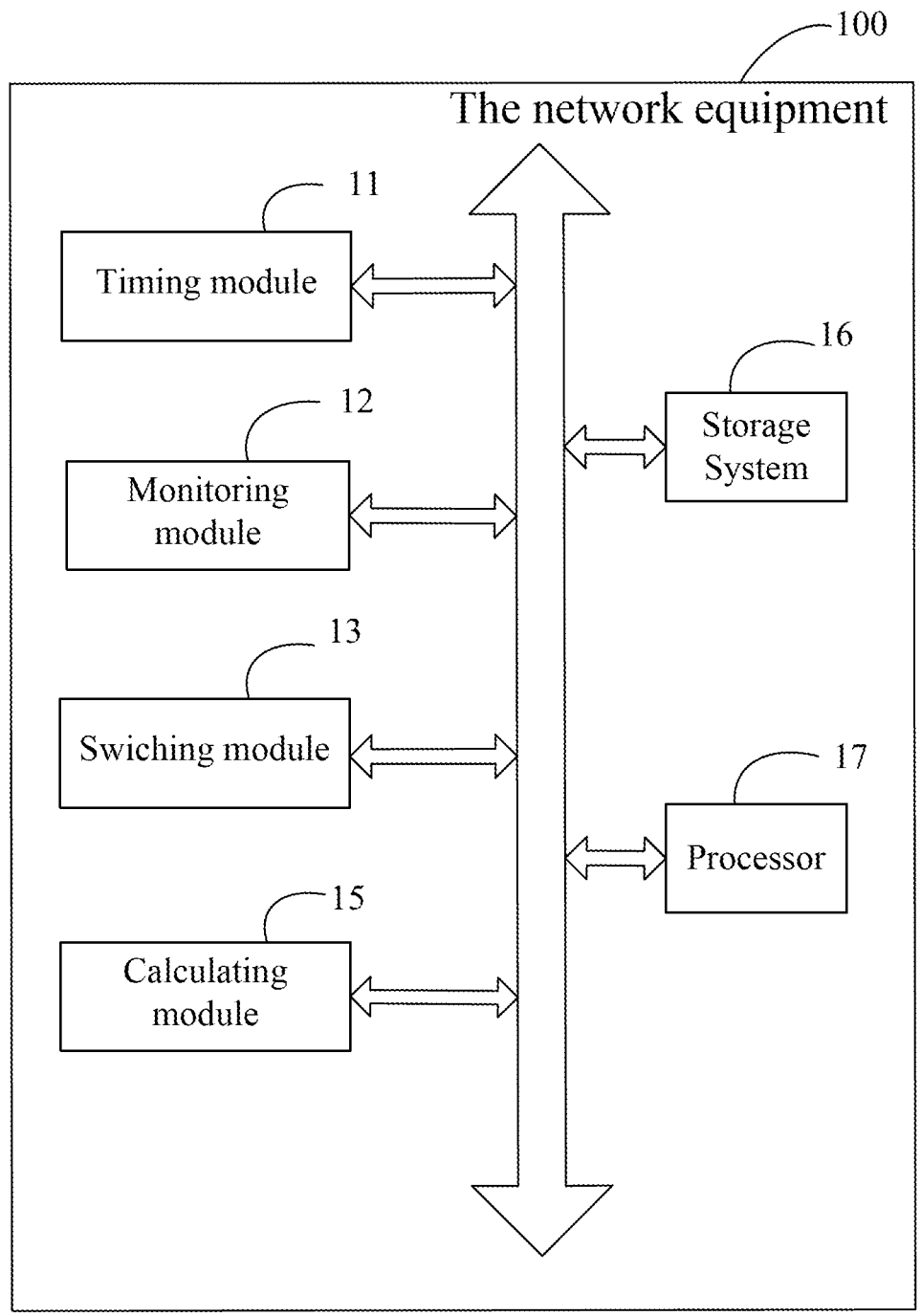
FIG. 1 is a function module diagram of one embodiment of a network equipment.

FIG. 1 shows one embodiment of a function module diagram of a network equipment 100. In one embodiment, the network equipment 100 can be a router, gateway, switch, wireless network controller, base station, or mobile terminal. In one embodiment, the network equipment 100 includes a timing module 11, a monitoring module 12, a switching module 13, a calculating module 15, a storage system 16, and a processor 17. These modules comprise software programs which are stored in storage system 16 and the processor 17 runs the software programs to achieve functions of these modules.

Figure 2:
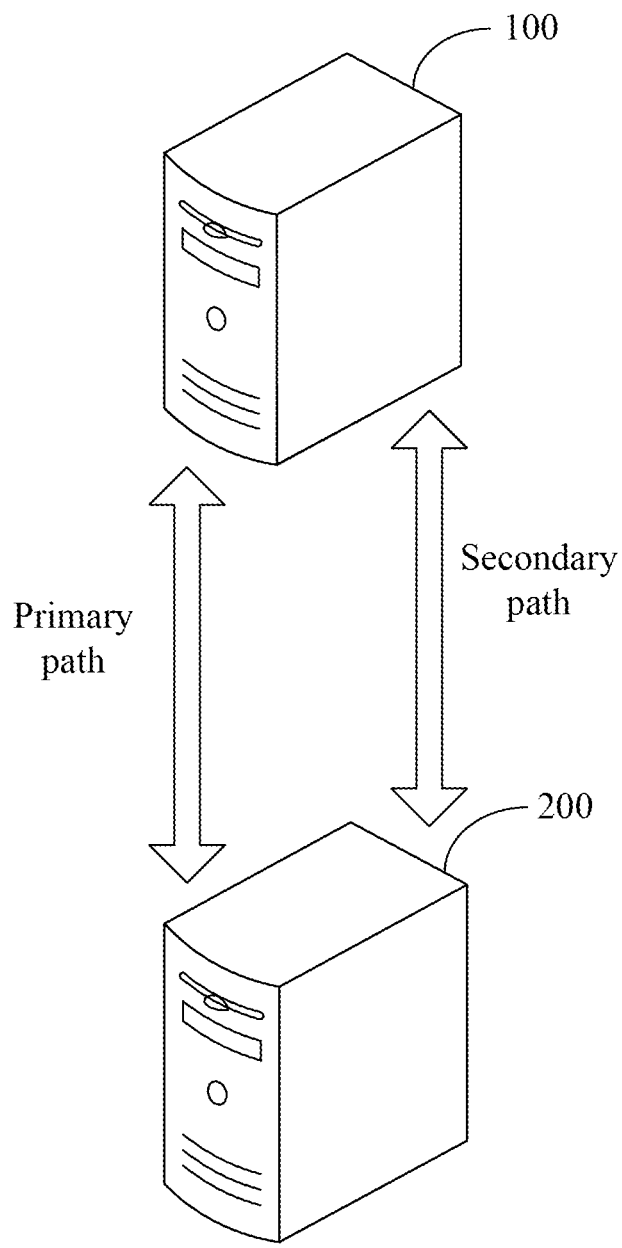
FIG. 2 is a schematic view of the network equipment of FIG. 1 in communication with a customer premises equipment through a primary path and a secondary path.

FIG. 2 is a schematic view of the network equipment in communication with a customer premises equipment (CPE) 200 through a primary path and a secondary path. In one embodiment, the network equipment 100 is in electronic communication with the CPE 200 through a primary path and a secondary path. In one embodiment, the CPE 200 can be a telephone, router, switch, residential gateway, home networking adaptor, or Internet access gateway which enables consumers to access the services of the communication service provider and distribute them around their house via a local access network.

Referring to FIG. 1 and FIG. 2, the network equipment 100 can automatically select and switch corresponding communication paths (e.g., the primary path and the secondary path) to transfer messages or data according to the current computer network state, such as abnormal termination, path failure, congestion, and packet traffic. In one embodiment, the communication paths are electrically wired paths where the transmission of electronic data flows.

The timing module 11 controls the sequence of an event or process, and measures and signals the end of time intervals. In one embodiment, the timing module 11 can be an electromechanical digital timing module, or an electronic digital timing module. When the network equipment 100 sends messages to the CPE 200 through the primary path, the timing module 11 starts timing from a specified time interval. When the network equipment 100 sends messages to the CPE 200 through the secondary path, the timing module 11 synchronously sends heartbeat packets to the CPE 200 through the primary path and the secondary path based on the SCTP that ensures reliable and in-sequence transport of message with congestion control. The timing module 11 receives feedback response signals corresponding to the heartbeat packets via the primary path and the secondary path, and calculates and records response times of the primary path and the secondary path.

In one embodiment, the heartbeat packet is an ordinary transfer control protocol (TCP)/Internet protocol (IP) acknowledgement packet without any piggybacking data and is used to complete the auxiliary work of applications and detect the existence of network connections, or check for patches and updates. The heartbeat packet includes packet contents, timing, and retry counts, and can be generally recognized based on timing characteristics, packet size, payload content, and a set of protocol related properties. When the timing module 11 synchronously sends heartbeat packets twice to the CPE 200 through the primary path and the secondary path and receives heartbeat response packets, the timing module 11 can obtain a first response time of the primary path, a second response time of the primary path, a third response time of the secondary path and a fourth response time of the secondary path. The first response time of the primary path is defined as a first response time that presents a time interval between the transmitted heartbeat packet and the received response signal of the primary path, and the second response time of the primary path is defined as a second response time that presents a time interval between the transmitted heartbeat packet and the received response signal of the primary path. The third response time of the secondary path is defined as a first response time that presents a time interval between the transmitted heartbeat packet and the received response signal of the secondary path, and the fourth response time of the secondary path is defined as a second response time that presents a time interval between the transmitted heartbeat packet and the received response signal of the secondary path.

The calculating module 15 calculates time differences and capacities of the primary path and the secondary path. In one embodiment, the calculating module 15 calculates a first time difference and a second time difference. The first time difference is substantially equal to the difference of time between the first response of the primary path and the second response time of the primary path, and the second time difference is substantially equal to the difference of time between the third response of the secondary path and the third response time of the primary path. Then, the calculating module 15 further calculates a first capacity of the primary path and a second capacity of the secondary path. The first capacity of the primary path is substantially equal to the heartbeat response packet value divided by the first time difference, and the second capacity of the secondary path is substantially equal to the heart response packet value divided by the second time difference.

In one embodiment, the switching module 13 can be an analog switch or an electronic switch. The switching module 13 is capable of selectively switching to the primary path or the secondary path.

In one embodiment, when the timing module 11 reaches a retransmission timeout (RTO), the switching module 13 is selectively switched to the secondary path from the primary path. Thus, the network equipment 100 communicates with the CPE 200 through the secondary path.

The monitoring module 12 is further capable of comparing the first response time of the primary path with the third response time of the secondary path and comparing the second response time of the primary path with the fourth response time of the secondary path, and comparing the first capacity of the primary path with the second capacity of the secondary path. In one embodiment, if the first response time of the primary path is less than the third response time of the secondary path, the second response time of the primary path is less than the fourth response time of the secondary path, and the first capacity of the primary path exceeds the second capacity of the secondary path, the switching module 13 switches the secondary path to the primary path because the communication quality of the primary path is more available than that of the secondary path, and the primary path can receive the feedback response signals more quickly than the secondary path. Thus, the network equipment 100 communicates and transfers data with the CPE 200 through the primary path.

If the monitoring module 12 determines the first response time of the primary path is greater than the third response time of the secondary path or the second response time of the primary path is greater than the fourth response time of the secondary path, the monitoring module 12 enables and resets the comparison count EA-count to zero, and the network equipment 100 maintains data transmission and communication with the CPE 200 through the secondary path, because the communication quality of the secondary path is more available than the primary path, and the secondary path can receive the feedback response signals more quickly than the primary path. If the first response time of the primary path is greater than the third response time of the secondary path and the second response time of the primary path is greater than the fourth response time of the secondary path, the monitoring module 12 enables the error count ERR-count to add by one because the communication quality of the primary path and the secondary path are poor. If the monitoring module 12 determines the error count ERR-count exceeds a preset threshold value in the storage system 16, the network equipment 100 fails to communicate with the CPE 200 and stops transferring data, because the primary path and the secondary path are inaccessible.

In another embodiment, when the switching module 13 switches over to the secondary path from the primary path, the timing module 11 sends heartbeat packets to the CPE through the primary path and the secondary path, and receives heartbeat response packets through the primary path and the secondary path to obtain a fifth response time of the primary path and a sixth response time of the secondary path.

In another embodiment, the calculating module 15 calculates a third capacity of the primary path and a fourth capacity of the secondary path, the third capacity of the primary path is substantially equal to the heartbeat response packet value divided by the fifth response time of the primary path, and the fourth capacity of the secondary path is substantially equal to the heartbeat response packet value divided by the sixth response time of the secondary path.

The monitoring module 12 compares the third capacity of the primary path with the fourth capacity of the secondary path and the switching module 13 according to comparison results. In one embodiment, if the third capacity of the primary path exceeds the fourth capacity of the secondary path, the switching module 13 selectively switches to the primary path because the communication quality of the primary path is more available than that of the secondary path, and the primary path can receive the feedback response signals more quickly than the secondary path. Thus, the network equipment 100 communicates and transfers data with the CPE 200 through the primary path.

If the monitoring module 12 determines neither the fifth response time nor the sixth response time is less than the RTO value, the monitoring module 12 enables the error count ERR-count to add by one because the communication quality of the primary path and the secondary path are poor. If the monitoring module 12 determines the error count ERR-count exceeds a preset threshold value in the storage system 16, the network equipment 100 fails to communicate with the CPE 200 and stops transferring data because the primary path and the secondary path are inaccessible.

Figure 3A:
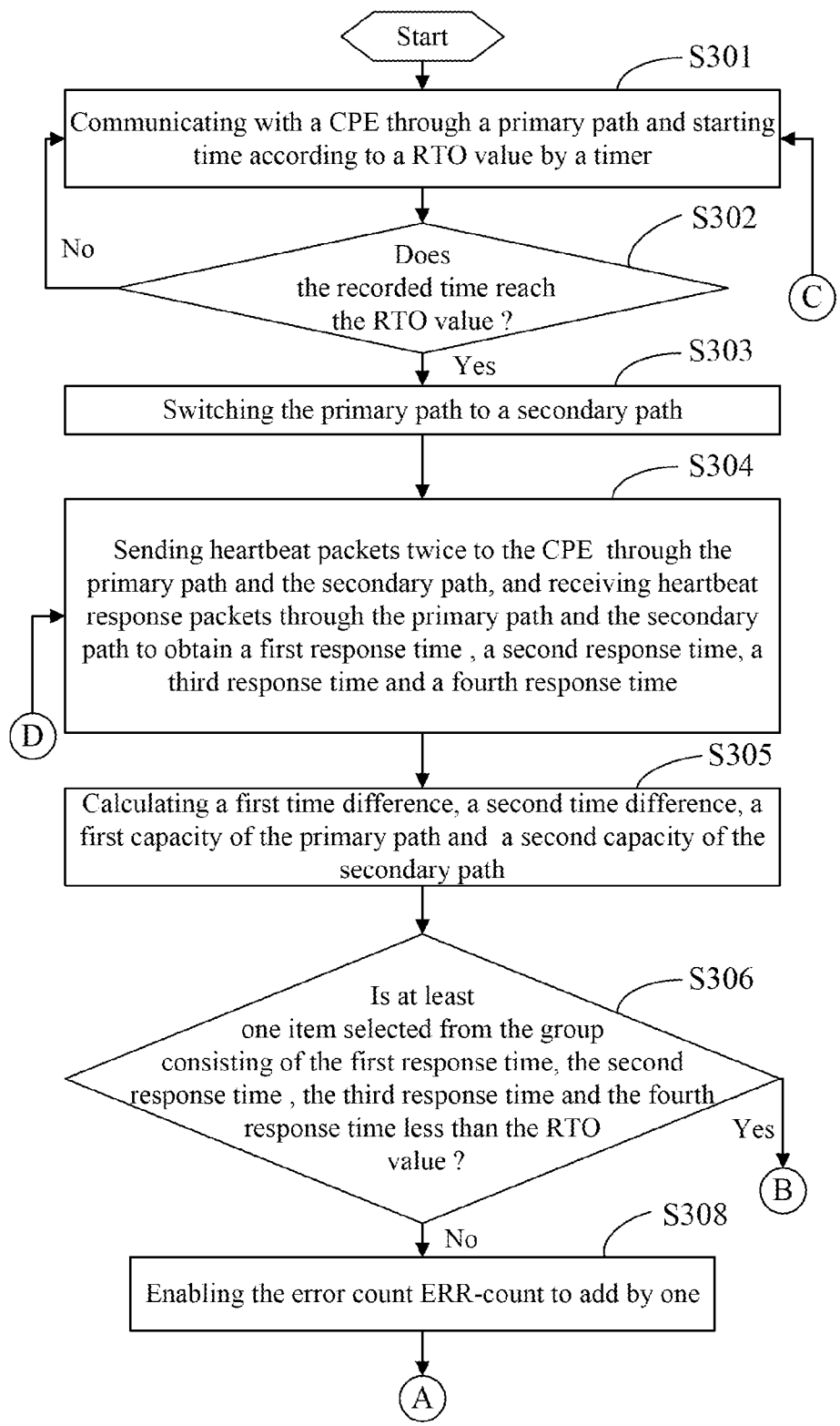
FIGS. 3A and 3B are flowcharts illustrating one embodiment of a method for selecting communication paths.
Figure 3B:
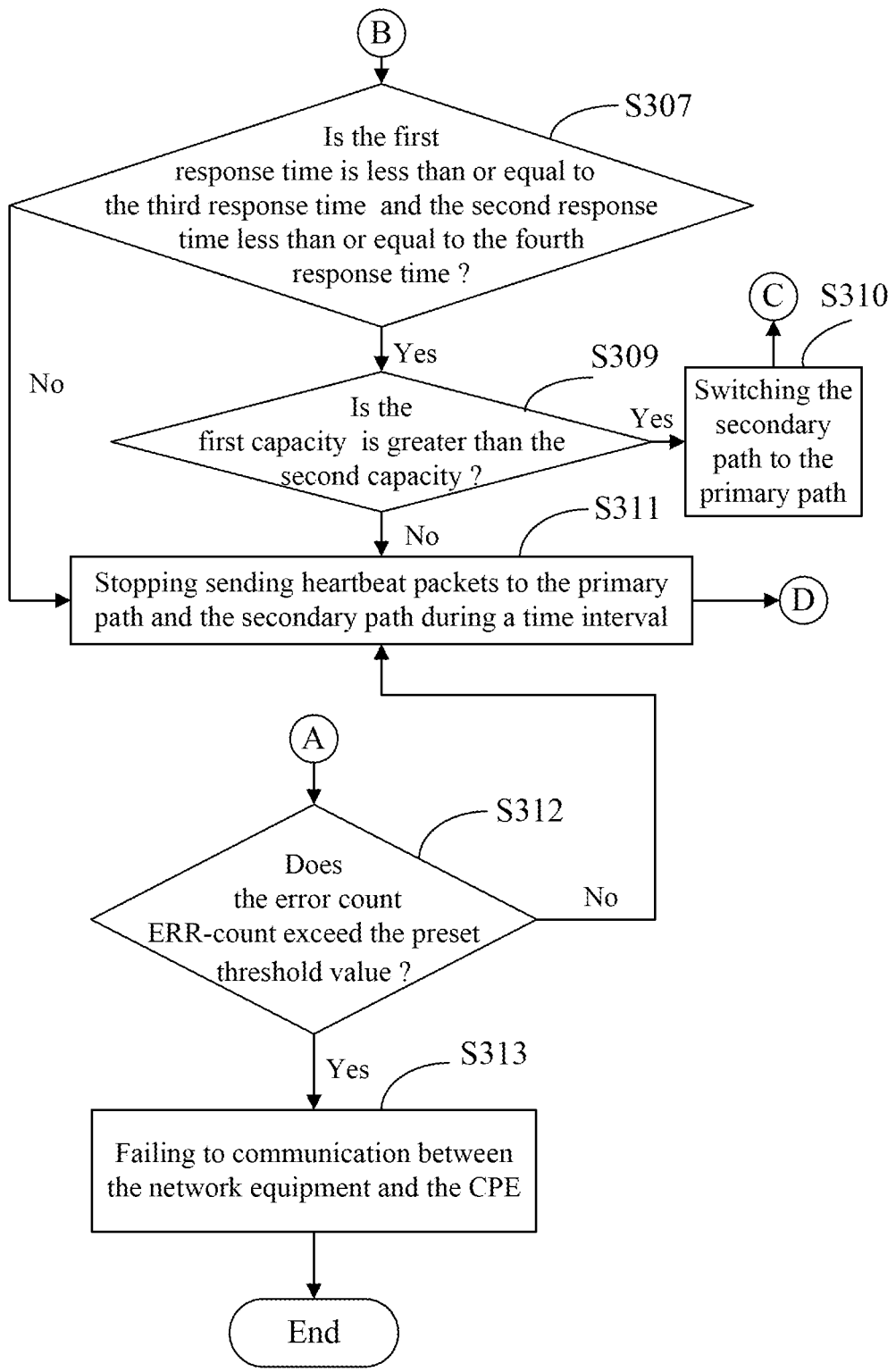

Also referring to FIGS. 3A and 3B, a method for selecting communicating paths according to one embodiment of the disclosure is depicted. The method can use the aforementioned network equipment 100, and may include at least the following steps.

In step S301, the network equipment 100 communicates and transfers data with the CPE 200 through the primary path, and the timing module 11 starts to record time according to the RTO value, such as 10 seconds.

In step S302, the timing module 11 determines whether a recorded time reaches the RTO values. If the recorded time fails to reach the RTO value, then step S301 is repeated, and the network equipment 100 continues to communicate with the CPE 200 via the primary path; if the recorded time exceeds the RTO values, the recorded time by the timing module 11 is overtime, then the method proceeds to step S303.

In step S303, the switching module 13 switches the primary path to the secondary path, and the network equipment 100 communicates with the CPE 200 through the secondary path.

In step S304, the timing module 11 of the network equipment 100 sends heartbeat packets twice to the CPE 200 through the primary path and the secondary path based on the SCTP, and receives heartbeat response packets through the primary path and the secondary path, and obtains a first response time of the primary path, a second response time of the primary path, a third response time of the secondary path, and a fourth response time of the secondary path. The method then proceeds to step S305.

In step S305, the calculating module 15 calculates time differences and capacity of the primary path and the secondary path. In one embodiment, the calculating module 15 calculates a first time difference and a second time difference. The first time difference is substantially equal to the difference of time between the first response of the primary path and the second response time of the primary path, and the second time difference is substantially equal to the difference of time between the third response of the secondary path and the third response time of the primary path. Then, the calculating module 15 further calculates a first capacity of the primary path and a second capacity of the secondary path. The first capacity of the primary path is substantially equal to the heartbeat response packet value divided by the first time difference, and the second capacity of the secondary path is substantially equal to the heart response packet value divided by the second time difference. The method then proceeds to step S306.

In step S306, the monitoring module 12 compares the first response time of the primary path, the second response time of the primary path, the third response time of the secondary path, and the fourth response time of the secondary path with the RTO value. If at least one item selected from the group consisting of the first response time of the primary path, the second response time of the primary path, the third response time of the secondary path, and the fourth response time of the secondary path is less than the RTO value, then the method proceeds to step S307; if none of the first response time of the primary path, the second response time of the primary path, the third response time of the secondary path, and the fourth response time of the secondary path is less than the RTO value, then the method proceeds to step S308.

In step S307, the monitoring module 12 compares the first response time of the primary path with the third response time of the secondary path and the second response time of the primary path with the fourth response time of the secondary path. If the first response time of the primary path is less than or equal to the third response time of the secondary path and the second response time of the primary path is less than or equal to the fourth response time of the secondary path, then the method proceeds to step S309; if not, then the method proceeds to step S311.

In step S308, because the first response time of the primary path, the second response time of the primary path, the third response time of the secondary path, and the fourth response time of the secondary path are greater than or equal to the RTO value, the monitoring module 12 enables the error count ERR-count to add by one. The method then proceeds to step S314.

In step S309, the monitoring module 12 compares the first capacity of the primary path with the second capacity of the secondary path, and if the first capacity of the primary path is greater than the second capacity of the secondary path, then the method proceeds to step S310; if not, then the method proceeds to step S311.

In step S310, because the first response time of the primary path is less than the third response time of the secondary path, the second response time of the primary path is less than the fourth response time of the secondary path and the first capacity of the primary path is greater than the second capacity of the secondary path, which signifies that the communication quality of the primary path is more accessible than that of the secondary path, and the primary path can receive the feedback response signals more quickly than the secondary path. In one embodiment, the switching module 13 selectively switches the secondary path to the primary path, step S301 is then repeated, and the network equipment 100 communicates and transfers data with the CPE 200 through the primary path.

In step S311, the timing module 11 stops sending heartbeat packets to the primary path and the secondary path during a time interval (e.g., 1 sec., 2 secs. or 2.5 secs.), then the method proceeds to step S304.

In step S312, the monitoring module 12 determines whether the error count ERR-count exceeds the preset threshold value in the storage system 16. If the error count ERR-count exceeds the preset threshold value, which signifies that the primary path and the secondary path are inaccessible, then the method proceeds to step S313; if the error count ERR-count is less than or equal to the preset threshold value, then the method proceeds to step S314.

In step S313, because all of the first response time of the primary path, the second response time of the primary path, the third response time of the secondary path, and the fourth response time of the secondary path are greater than or equal to the RTO value, or the first capacity of the primary path is less than or equal to the second capacity of the secondary path according to continuous comparisons, which signifies that the communication paths are unavailable, the network equipment 100 fails to communicate with the CPE 200, and stops transferring data.

In summary, in the network equipment 100 of this present disclosure, the timing module 11 can send heartbeat packets to the primary path and the secondary path based on the SCTP, and receives heartbeat response packets through the primary path and the secondary path to obtain the first response time of the primary path, the second response time of the primary path, the third response time of the secondary path and the fourth response time of the secondary path, and the calculating module 15 calculates the first time difference, a second time difference, the first capacity of the primary path and the second capacity of the secondary path. Thus, the monitoring module 12 compares the first response time of the primary path with the third response time of the secondary path, the second response time of the primary path with the fourth response time of the secondary path, and the first capacity of the primary path with the second capacity of the secondary path. The switching module 13 automatically turns on the primary path or the secondary path, which can ensure reliable and in-sequence transport of data with congestion control. In addition, the network equipment 100 can automatically switch over one communication path in real-time when one of the primary path and the secondary path has abnormal termination or path failure due to link interrupted such as error code packet loss, congestion packet loss, or time delay, which may reduce the packet loss ration of the data and increase transmission rate and quality of the data.

Figure 4A:
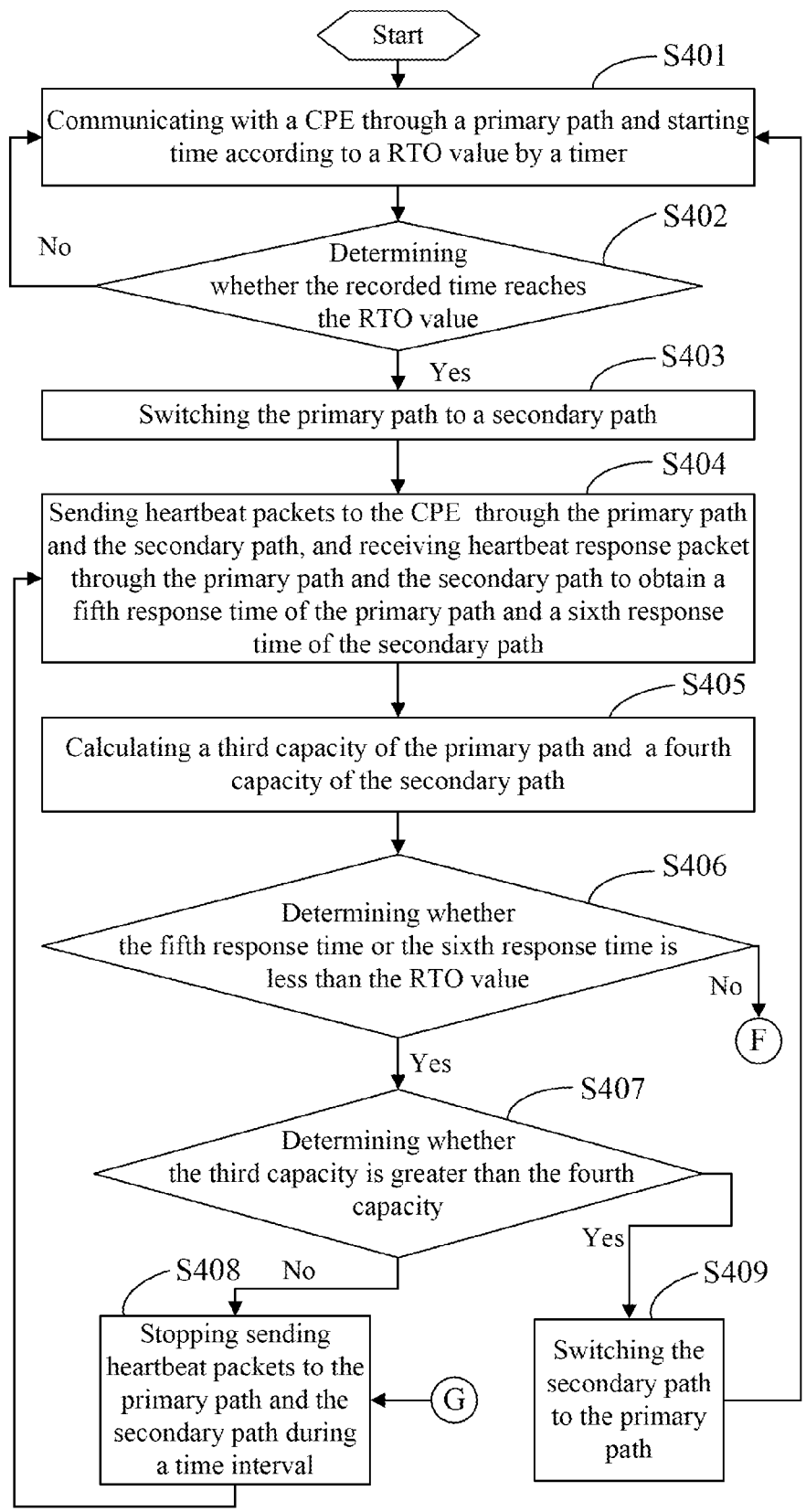
FIGS. 4A and 4B are flowcharts illustrating another embodiment of a method for selecting communication paths.
Figure 4B:
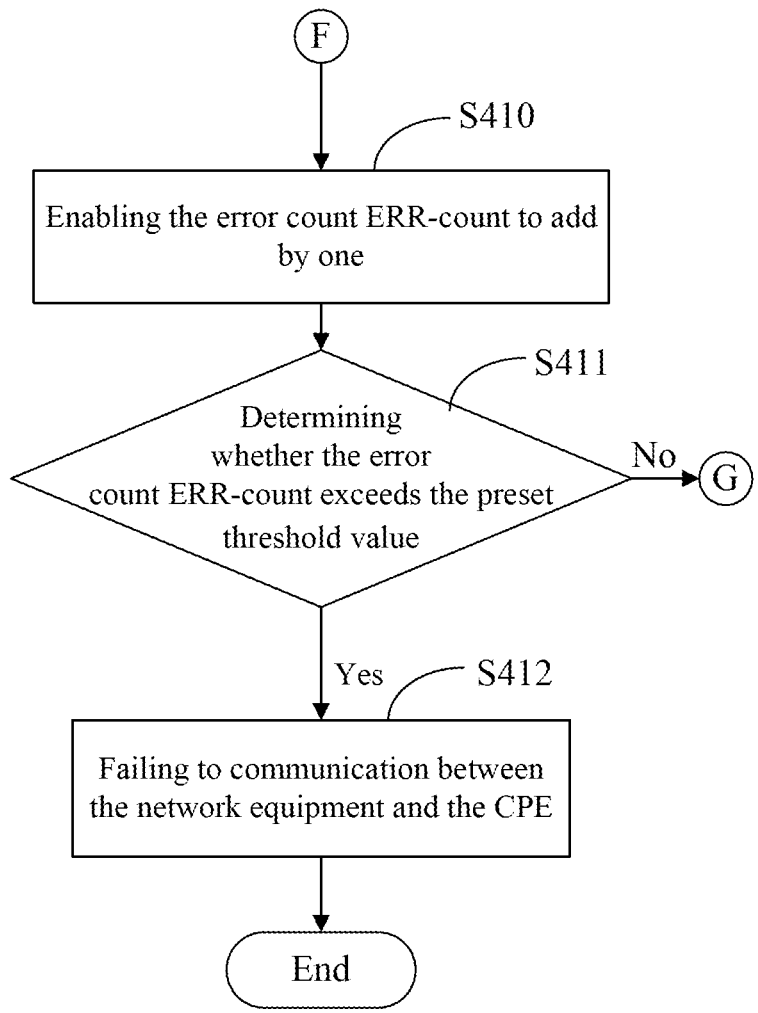

Referring to FIGS. 4A and 4B, a method for selecting communicating paths according to another embodiment of the disclosure is depicted. The method can use the aforementioned network equipment 100, and may include at least the following steps.

In step S401, the network equipment 100 communicates and transfers data with the CPE 200 through the reset primary path, and the timing module 11 starts to record time according to the RTO value, such as 10 seconds.

In step S402, the monitoring module 12 determines whether a recorded time reaches the RTO values. If the recorded time fails to reach the RTO value, then step S401 is repeated, and the network equipment 100 continues to communicate with the CPE 200 via the primary path; if the recorded time exceeds the RTO values, the recorded time by the timing module 11 is overtime, and the method proceeds to step S403.

In step S403, the switching module 13 switches the primary path to the secondary path, and the network equipment 100 communicates with the CPE 200 through the secondary path.

In step S404, the timing module 11 of the network equipment 100 sends heartbeat packets to the CPE 200 through the primary path and the secondary path based on the SCTP, and receives heartbeat response packets through the primary path and the secondary path to obtain a fifth response time of the primary path and a sixth response time of the secondary path. The method then proceeds to step S405.

In step S405, the calculating module 15 calculates a third capacity of the primary path and a fourth capacity of the secondary path. In one embodiment, the third capacity of the primary path is substantially equal to the heartbeat response packet value divided by the fifth response time of the primary path, and the fourth capacity of the secondary path is substantially equal to the heartbeat response packet value divided by the sixth response time of the secondary path.

In step S406, the monitoring module 12 compares the fifth response time of the primary path and the sixth response time of the secondary path with the RTO value. If either the fifth response time of the primary path and the sixth response time of the secondary path is less than the RTO value, then the method proceeds to step S407; if neither the fifth response time of the primary path nor the sixth response time of the secondary path is less than the RTO value, then the method proceeds to step S410.

In step S407, the monitoring module 12 also compares the third capacity of the primary path with the fourth capacity of the secondary path. If the third capacity of the primary path is less than or equal to the fourth capacity of the secondary path, then the method proceeds to step S408; if the third capacity of the primary path is greater than the fourth capacity of the secondary path, then the method proceeds to step S409.

In step S408, the timing module 11 stops sending heartbeat packets to the primary path and the secondary path during a time interval (e.g., 1 sec., 2 secs. or 2.5 secs.), then the method proceeds to step S404.

In step S409, the switching module 13 selectively switches the secondary path to the primary path, then step S401 is repeated, and the network equipment 100 communicates and transfers data with the CPE 200 through the primary path.

In step S410, the monitoring module 12 enables the error count ERR-count to add by one. The method then proceeds to step S411.

In step S411, the monitoring module 12 determines whether the error count ERR-count exceeds the preset threshold value in the storage system 16. If the error count ERR-count exceeds the preset threshold value, which signifies that the primary path and the secondary path are inaccessible, then the method proceeds to step S412; if the error count ERR-count is less than or equal to the preset threshold value, then the method proceeds to step S408.

In step S412, because the fifth response time of the primary path and the sixth response time of the secondary path are greater than or equal to the RTO value, or the third capacity of the primary path is less than or equal to the fourth capacity of the secondary path according to continuous comparisons, which signifies that the communication paths are unavailable, the network equipment 100 fails to communicate with the CPE 200, and stops transferring data.

In summary, in the network equipment 100 of this present disclosure, the timing module 11 can send heartbeat packets to the primary path and the secondary path based on the SCTP, and receives heartbeat response packets through the primary path and the secondary path to obtain the fifth response time of the primary path and the sixth response time of the secondary path, and the calculating module 15 calculates the third capacity of the primary path and the fourth capacity of the secondary path. Thus, the monitoring module 12 compares the third capacity of the primary path with the sixth capacity of the secondary path, to selectively and automatically turn on the primary path or the secondary path, which can ensure reliable and in-sequence transport of data with congestion control. In addition, the network equipment 100 can automatically switch over one communication path in real-time when one of the primary path and the secondary path has abnormal termination or path failure due to link interrupted such as error code packet loss, congestion packet loss, or time delay, which may reduce the packet loss ration of the data and increase transmission rate and quality of the data.

In the present specification and claims, the word "a" or "an" preceding an element does not exclude the presence of a plurality of such elements. Further, the word "comprising" does not exclude the presence of elements or steps other than those listed.

It is to be understood, however, that even though numerous characteristics and advantages of the exemplary disclosure have been set fourth in the foregoing description, together with details of the structure and function of the exemplary disclosure, the disclosure is illustrative only, and changes may be made in detail, especially in matters of shape, size, and arrangement of parts within the principles of this exemplary disclosure to the full extent indicated by the broad general meaning of the terms in which the appended claims are expressed.

What is claimed is:

1. A computerized method for selecting an electronic communication path between a network equipment and a customer premise equipment (CPE), the method comprising steps of:

communicating with the CPE through a primary path by the network equipment and starting to time according to a retransmission timeout (RTO) value of the network equipment, wherein the path is an electrical wired path where the transmission of electronic data flows across;

determining whether a recorded time reaches the RTO value;

switching the primary path to a secondary path when the recorded time reaches the RTO value;

sending heartbeat packets twice to the CPE through the primary path and the secondary path and receiving heartbeat response packets from the CPE to obtain a first response time of the primary path, a second response time of the primary path, a third response time of the secondary path, and a fourth response time of the secondary path;

calculating a first time difference between the first response time and the second response time and a second time difference between the third response time and the fourth response time;

calculating a first capacity of the primary path and a second capacity of the secondary path based on the first time difference and the second time difference, wherein the first capacity of the primary path is equal to the heartbeat response packets value divided by the first time difference, and the second capacity of the secondary path is equal to the heartbeat response packets value divided by the second time difference; and switching the secondary path to the primary path when the first response time is less than the third response time, the second response time is less than the fourth response time, and the first capacity exceeds the second capacity.

2. The computerized method of claim 1, further comprising continuously communicating with the CPE through the primary path by the network equipment and starting to time according to the RTO value of the network equipment until the recorded time reaches the RTO value.

3. The computerized method of claim 2, further comprising:

comparing the first response time, the second response time, the third response time, and the fourth response time with the RTO value; and comparing the first response time with the third response time and the second response time with the fourth response time when at least one item selected from the group consisting of the first response time, the second response time, the third response time, and the fourth response time is less than the RTO value.

4. The computerized method of claim 3, further comprising comparing the first capacity with the second capacity when the first response time is less than or equal to the third response time and the second response time is less than or equal to the fourth response time.

5. The computerized method of claim 4, further comprising switching the secondary path to the primary path when the first capacity is greater than the second capacity, and stopping sending heartbeat packets to the primary path and the secondary path during a time interval when the first capacity is less than or equal to the second capacity.

6. The computerized method of claim 3, further comprising enabling an error count to add by one when none of the first response time, the second response time, the third response time, and the fourth response time is less than the RTO value.

7. The computerized method of claim 6, further comprising determining whether the error count exceeds a preset threshold value.

8. The computerized method of claim 7, further comprising failing to communicate with the CPE and stopping transferring data when the error count exceeds the preset threshold value, and stopping sending heartbeat packets to the primary path and the secondary path during the time interval when the error count is less than or equal to the preset threshold value.

9. A network equipment in electronic communication with a customer premises equipment (CPE) through a primary electrical path and a secondary electrical path, the network equipment comprising:

a processor; and a storage system, storing one or more software programs in the form of computerized codes that are executed by the processor, the one or more software programs comprising instructions for:

setting a record time and sending heartbeat packets twice to the CPE through the primary path and the secondary path and receiving heartbeat response packets from the CPE to obtain a first response time of the primary path, a second response time of the primary path, a third response time of the secondary path, and a fourth response time of the secondary path;

calculating a first time difference between the first response time and the second response time and a second time difference between the third response time and the fourth response time, and calculating a first capacity of the primary path and a second capacity of the secondary path based on the first time difference and the second time difference, wherein the first capacity of the primary path is equal to the heartbeat response packets value divided by the first time difference, and the second capacity of the secondary path is equal to the heartbeat response packets value divided by the second time difference;

comparing the first response time with the third response time, comparing the second response time with the fourth response time, and comparing the first capacity with the second capacity; and switching the primary electrical path to the secondary electrical path when the record time reaches a retransmission timeout (RTO), and switching the secondary electrical path from the primary electrical path when the first response time is less than the third response time, the second response time is less than the fourth response time, and the first capacity of the primary path exceeds the second capacity.

10. The network equipment of claim 9, wherein the one or more software programs further comprise instructions for comparing sending heartbeat packets to the CPE through the primary path and the secondary path and receiving heartbeat response packet from the CPE to obtain a fifth response time of the primary path and a sixth response time of the secondary path, calculating a third capacity of the primary path and a fourth capacity of the secondary path, comparing the third capacity with the fourth capacity, and switching the secondary electrical path from the primary electrical path when the third capacity exceeds the fourth capacity.

11. The network equipment of claim 10, wherein the third capacity is equal to the heartbeat response packet value divided by the fifth response time, and the second capacity is equal to the heartbeat response packet value divided by the sixth response time.

12. The network equipment of claim 11, wherein the one or more software programs further comprise instructions for enabling an error count to add by one when none of the first response time, the second response time, the third response time, and the fourth response time is less than the RTO value, wherein the error count is stored in a read only memory or a random access memory, and initial values of the error count are preset as zero.

13. The network equipment of claim 12, wherein the one or more software programs further comprise instructions for determining whether the error count exceeds a preset threshold value.

14. The network equipment of claim 13, wherein the one or more software programs further comprise instructions for failing to communicate with the CPE and stopping transferring data when the error count exceeds the preset threshold value, and stopping sending heartbeat packets to the primary path and the secondary path during a time interval when the error count is less than or equal to the preset threshold value.

15. A computerized method for selecting an electronic communication path between a network equipment and a customer premise equipment (CPE), the method comprising:
　　communicating with the CPE through a primary path by the network equipment and starting to time according to a retransmission timeout (RTO) value of the network equipment, wherein the path is an electrical wired path where the transmission of electronic data flows across;
　　determining whether a recorded time reaches the RTO value;
　　switching the primary path to a secondary path when the recorded time reaches the RTO value;
　　sending heartbeat packets to the CPE through the primary path and the secondary path and receiving heartbeat response packets from the CPE to obtain a fifth response time of the primary path and a sixth response time of the secondary path;
　　calculating a third capacity of the primary path and a fourth capacity of the secondary path based on the fifth response time and the sixth response time, wherein the third capacity is equal to the heartbeat response packet value divided by the fifth response time, and the fourth capacity is equal to the heartbeat response packet value divided by the sixth response time; and
　　switching the secondary path to the primary path when the third capacity exceeds the fourth capacity.

16. The computerized method of claim 15, further comprising continuously communicating with the CPE through the primary path by the network equipment and starting to time according to the RTO value of the network equipment until the recorded time reaches the RTO value.

17. The computerized method of claim 16, further comprising comparing the fifth response time and the sixth response time with the RTO value.

18. The computerized method of claim 17, further comprising enabling an error count to add by one when either the fifth response time or the sixth response time is less than the RTO value.

19. The computerized method of claim 18, further comprising determining whether the error count exceeds a preset threshold value, failing to communicate with the CPE and stopping transferring data when the error count exceeds the preset threshold value, and stopping sending heartbeat packets to the primary path and the secondary path during a time interval when the error count is less than or equal to the preset threshold value.

\* \* \* \* \*